(12) United States Patent
Ookubo

(10) Patent No.: US 7,588,605 B2
(45) Date of Patent: Sep. 15, 2009

(54) SCANNING TYPE PROBE MICROSCOPE

(75) Inventor: Norio Ookubo, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 266 days.

(21) Appl. No.: 11/835,036

(22) Filed: Aug. 7, 2007

(65) Prior Publication Data
US 2008/0048114 A1  Feb. 28, 2008

(30) Foreign Application Priority Data
Aug. 22, 2006  (JP) .............................. 2006-225729

(51) Int. Cl.
*G01N 13/10* (2006.01)
(52) U.S. Cl. ...................... 850/11; 850/1; 850/4; 850/8; 850/10; 850/63
(58) Field of Classification Search .................. 250/306, 250/307; 850/1, 4, 8, 10, 11, 12, 33, 63; 702/33, 35, 36, 168
See application file for complete search history.

(56) References Cited
FOREIGN PATENT DOCUMENTS
JP  2003-185555  7/2003

OTHER PUBLICATIONS

T.R. Albrecht et al., "Frequency modulation detection using high-Q cantilevers for enhanced force microscope sensitivity", J. Appl. Phys. 69, 668 (1991), (p. 670).

*Primary Examiner*—David A Vanore
*Assistant Examiner*—Michael Maskell
(74) *Attorney, Agent, or Firm*—Brinks Hofer Gilson & Lione

(57) ABSTRACT

To be able to measure a value with regard to a dissipation, or a value in proportion to a dissipation energy without making a premise by being brought into a steady state. Exciting means 12 for carrying out an excitation by following a resonance frequency of a cantilever 2, a displacement detector 10 for detecting a displacement of a stylus at a tip of the cantilever 2, an amplitude detector 20 for successively providing an amplitude from a signal from the displacement detector 10, a difference value detector 21 for providing a time difference value of the amplitude, a divider 22 for providing a value of a quotient between the time difference values, a logarithmic converter 23 for providing a logarithmic value of the value of the quotient, and a second divider 24 for providing a value with regard to a dissipation by calculating a value constituted by dividing the logarithmic value by a difference time period are provided.

6 Claims, 4 Drawing Sheets

SCANNING TYPE PROBE MICROSCOPE

This application claims priority under 35 U.S.C. § 119 to Japanese Patent Application Nos. JP2006-225729 filed Aug. 22, 2006, the entire content of which is hereby incorporated by reference.

BACKGROUND OF THE INVENTION

1. Field of the Invention

The present invention relates to a scanning type probe microscope having exciting means for carrying out an excitation by following a resonance frequency of a cantilever and means for detecting a displacement of a stylus of a tip of the cantilever, particularly relates to a scanning type probe microscope for measuring a physical amount with regard to a dissipation and a scanning type probe microscope characterized in using a dissipation amount for a control of a distance between a stylus and a sample.

2. Description of the Related Arts

As a representative one of a scanning type probe microscope, there is known a method, or an apparatus of an atomic force microscope (AFM) for bending to resonate a cantilever and controlling a distance between a stylus and a sample such that a change in a resonance frequency produced by an interactive action of the stylus at a tip of the cantilever and the sample becomes constant (refer to, for example, T. R. Albrecht et al., "Frequency modulation detection using high-Q cantilevers for enhanced force microscope sensitivity", J. Appl. Phys. 69, 668 (1991), (page 670)).

However, according to a generally utilized AFM (a method of controlling a distance between a stylus and a sample by detecting an interactive action between the stylus and the sample by a change in an amplitude of a displacement of the stylus), a Q value of resonance of a cantilever becomes gigantic in vacuum, and therefore, there poses a problem that a response time period of a displacement of the stylus is prolonged to make use thereof difficult.

As a solution therefor, a frequency modulation type atomic force microscope (FM-AFM) has been devised (refer to, for example, JP-A-2003-185555). According to the FM-AFM, by adopting a control of a distance between a stylus and a sample to make a frequency deviation constant, even in the case of providing a large Q value as in vacuum, AFM measurement is enabled.

SUMMARY OF THE INVENTION

However, under a normal condition of FM-AFM, a time period τQ required until oscillation of a cantilever is brought into a steady state is as long as 100 msec, normally, a stay time period τM at respective scanning points of a stylus is 1 msec, and therefore, a displacement, or an amplitude of the stylus is almost always brought into a transient procedure, and therefore, a correct result is not provided by a dissipation measuring method of a background art on a premise of a steady state and also application thereof becomes difficult since the application is accompanied by a feedback control to an amplitude in the transient procedure.

It is an object of the invention to provide a scanning type probe microscope capable of measuring a value with regard to a dissipation even in such a transient procedure, and a scanning type probe microscope using the measured value with regard to the dissipation for controlling a distance between a stylus and a sample.

In order to resolve the above-described problem, according to the invention, by measuring a displacement of a stylus excited by exciting means following a resonance of a cantilever and by being processed by the following calculation procedure, a value with regard to a dissipation in a transient procedure is provided. That is, oscillation amplitudes $A_{j+1}$, $A_j$, $A_{j-1}$ ... of the stylus displacement are successively measured, difference values thereof $A_{j+1}-A_j$, $A_j-A_{j-1}$, ratios of the difference values $(A_{j+1}-A_j)/(A_j-A_{j-1})$ are calculated, and ratios of logarithms of the ratios to a difference time period $\Delta t$ are provided to thereby calculate the value $\xi$ with regard to the dissipation of the resonance. That is, $\xi$ can be provided by following equation.

$$\xi = \ln\{(A_{j+1}-A_j)/(A_j-A_{j-1})\}/\Delta t$$

where $\xi = \omega/2Q$, $\omega$ is a resonance frequency, Q is a Q value of a resonance of the cantilever, further, j is a suffix expressing a time sequence. $\xi$ is a rate constant of a transient procedure which is going to be brought into a steady state, or an inverse number of a time constant of the transient procedure.

According to the scanning type probe microscope of the invention, the value $\xi$ with regard to the dissipation can be measured without constituting a premise by the fact that oscillation of the stylus is brought into the steady state. Therefore, a deviation of the resonance frequency determined by an elastic term and value $\xi$ with regard to a dissipation can simultaneously be measured.

Further, according to the scanning type probe microscope of the invention, the value $\xi$ with regard to the dissipation can be measured without constituting the premise by the fact that the oscillation of the stylus is brought into the steady state, and a dissipation value in proportion to a dissipation energy can be provided by using the value of the frequency $\omega$ following the resonance and constituting a ratio $\xi/\omega$ thereof.

Means for controlling a distance between the stylus and the sample is provided and the distance between the stylus and the sample is controlled based on the value with regard to the dissipation or the dissipation value in proportion to the dissipation energy by the means.

ADVANTAGE OF THE INVENTION

According to the scanning type probe microscope of the invention, the value with regard to the dissipation or the value in proportion to the dissipation energy can be measured without constituting the premise of the steady state. Further, a variety of information can efficiently be collected such that the value with regard to the dissipation or the dissipation value can be measured without waiting for a time period until reaching the steady state at respective scanning points, and also the resonance frequency can simultaneously be measured.

Further, according to the scanning type probe microscope of the invention, a new physical property can be visualized by controlling the distance between the sample and the stylus by using the measured dissipation value. The new physical property provides information of a modulus of elasticity of the surface of the sample when the dissipated energy is made to be constant between the stylus and the sample.

DESCRIPTION OF THE PREFERRED EMBODIMENTS

First Embodiment

Figure 1:
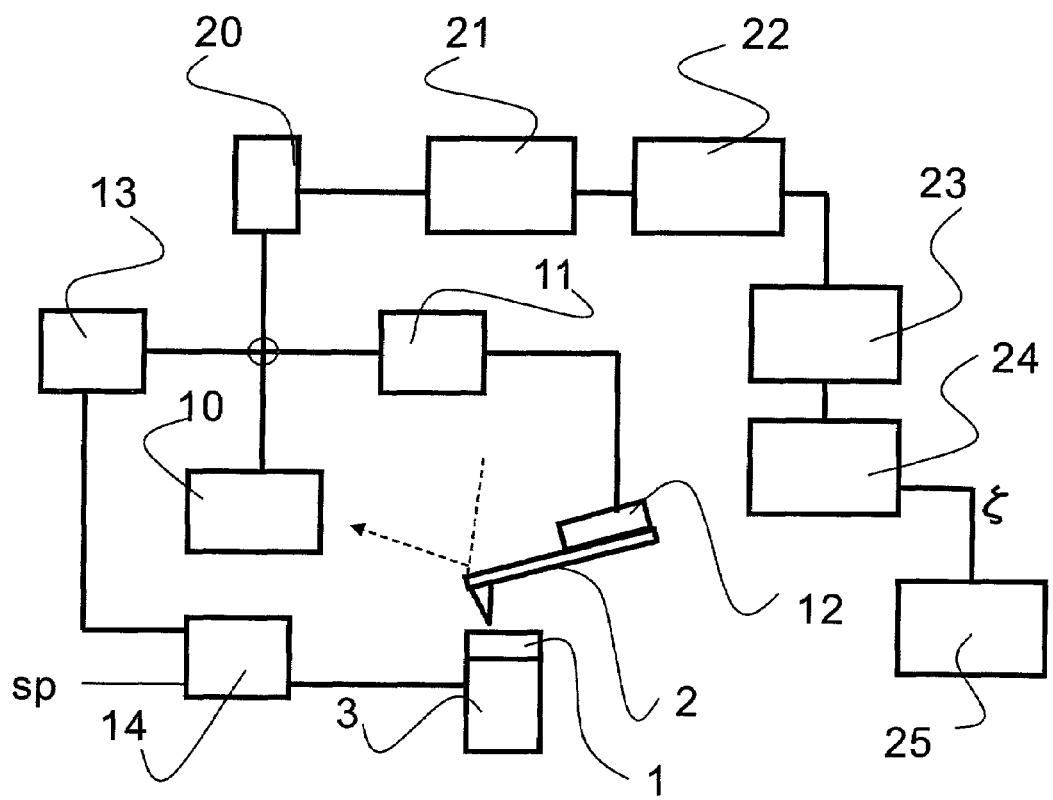
FIG. 1 is a block diagram showing a scanning type probe microscope according to a first embodiment of the invention.

A scanning type probe microscope of a first embodiment according to the invention will be explained in reference to a block diagram shown in FIG. 1. A cantilever 2 having a stylus at a tip thereof for measuring a surface of a sample 1 is arranged oppositely to the sample 1. The cantilever is oscillated by a frequency set by a cantilever exciter 12. Further, displacement detecting means for detecting a displacement of the tip portion of the cantilever 2, that is, a displacement of oscillation of the stylus is constituted by a method referred to as a so-to-speak optical lever system. A laser beam from a light source (not illustrated) is reflected by the cantilever 2 and is incident on a displacement detector 10 from a difference in an intensity or the like. Further, an amplitude of the cantilever is displaced by an atomic force or an interactive action between the stylus and the sample such as contact or the like, and the displacement can be detected by the displacement detector 10. As a displacement signal outputted from the displacement detector 10, a positive feedback signal is supplied to the cantilever exciter 12 by way of a positive feedback amplifier 11 comprising a phase shifter and an amplifier. The oscillation of the cantilever is maintained in a resonance state by the feedback loop, and a change in the interactive action of the stylus and the sample is tracked by a resonance state (resonance frequency and Q value). Further, the displacement signal outputted from the displacement detector 10 is supplied to a frequency detector 13 to detect the resonance frequency of the cantilever. A difference between the frequency signal and a set frequency sp is calculated and amplified by an error amplifier 14, and is negatively fed back to a piezoelectric element 3 constituting moving means for dealing with a z displacement of the sample (up and down direction of FIG. 1) to displace the piezoelectric element 3 to thereby control the distance between the stylus and the sample.

According to the invention, the amplitude of the displacement signal constituting the output of the displacement detector 10 is successively detected by an amplitude detector 20, from oscillation amplitudes $A_{j+1}, A_j, A_{j-1} \ldots$ of the successively detected stylus displacements, differences thereof. $A_{j+1}-A_j, A_j-A_{j-1}=$ are detected by a difference value detector 21, ratios of the difference values $(A_{j+1}-A_j)/(A_j-A_{j-1})$ are further detected by a divider 22, logarithms of the ratios are detected by a logarithmic converter 23, and ratios of the logarithms to a difference time period $\Delta t$ are detected by a second divider 24 to thereby provide a value $\xi$ with regard to dissipation of oscillation. That is, $\xi$ is provided by the following equation.

$$\xi = \ln\{(A_{j+1}-A_j)/(A_j-A_{j-1})\}/\Delta t$$

Further, it is preferable to digitize the successively detected amplitudes, and it is preferable to input the digitized amplitude data to a computer or a digital signal processor (DSP), thereafter, carry out a series of operation of calculating time difference values, quotients between time difference values, logarithms of quotients, ratios of logarithms to a difference time period in real time at inside of a computer or DSP. Naturally, it is preferable to carry out the operation with high accuracy by using utilizable long bit data.

Further, the oscillation amplitudes $A_j$ of the stylus may be values provided by digitizing the displacement signals of the stylus and provided in digital by addition, subtraction in synchronism with phases of the signals, or may be provided by detecting the displacement signals and successively averaging the displacement signals by a low pass filter. Further, it is very preferable to average to process the amplitudes successively, over a plurality of periods for improving a signal/noise ratio.

Further, there may be provided a scanning mechanism of an XY stage or the like for relatively moving the sample surface and the stylus, and an image apparatus 25 for measuring value $\xi$ with regard to the dissipation by scanning the stylus or the sample and imaging the value.

Second Embodiment

A scanning type probe microscope of the second embodiment according to the invention will be explained in reference to a block diagram shown in FIG. 2. Further, an explanation of a point common to that of the first embodiment will be omitted.

Figure 2:
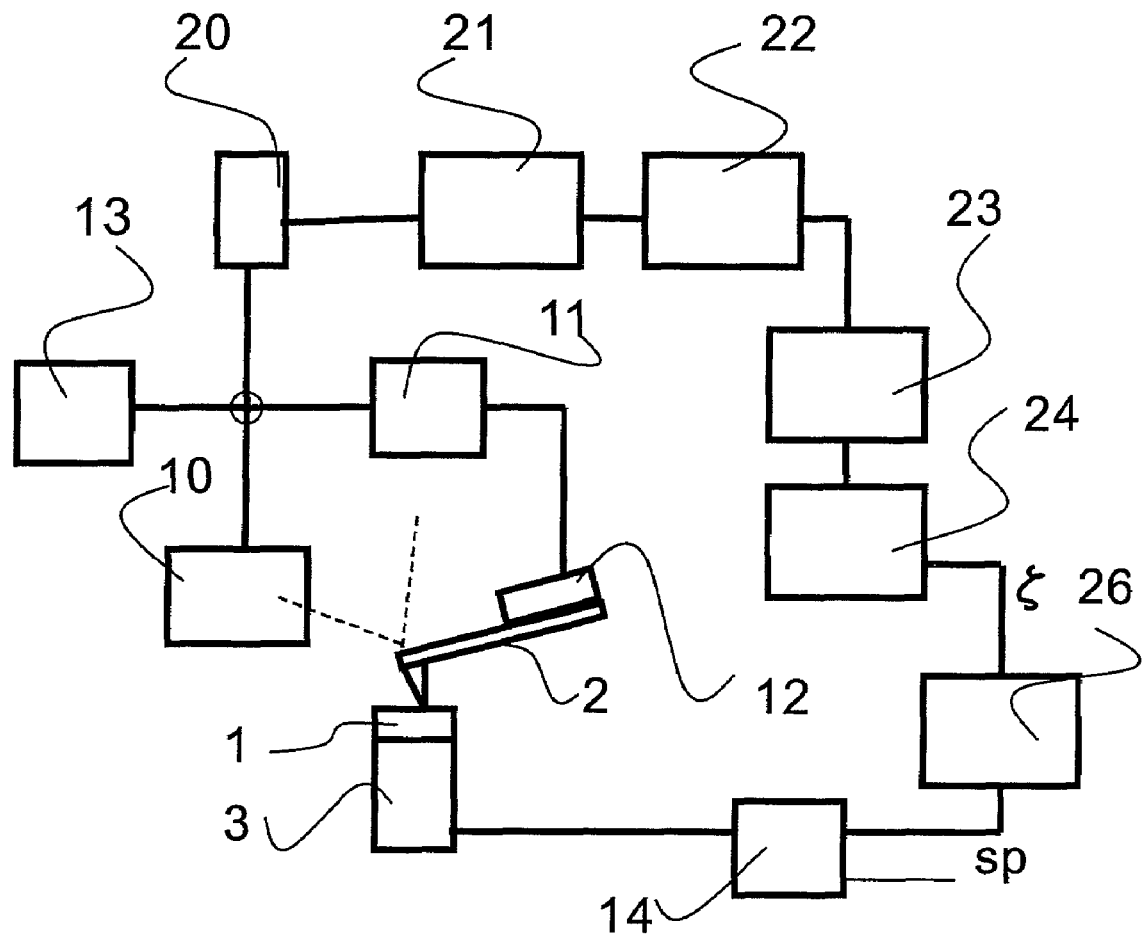
FIG. 2 is a block diagram showing a scanning type probe microscope according to a second embodiment of the invention.

In FIG. 2, instead of the control by the frequency error, the value $\xi$ with regard to the dissipation outputted from the second divider 24 is subjected to digital/analog conversion by a signal converter 26, the difference from the set value sp of the frequency is amplified by the error amplifier 14 to be fed back to the piezoelectric element 3 constituting the moving means for carrying out the z displacement of the sample to thereby control the distance between the stylus and the sample.

That is, the second embodiment may be regarded as a scanning type probe microscope of a quasi dissipation control type for controlling the distance between the stylus and the sample to make the value with regard to the dissipation constant.

Naturally, although not illustrated in FIG. 2, as means for collecting, preserving and displaying a value in proportion to a feedback voltage to the piezoelectric element and a measured value of a resonance frequency ω from the frequency detector 13, it is preferable to provide an analog/digital converter (ADC), a digital/analog converter (DAC), or DSP, a computer, a display and the like.

Third Embodiment

A scanning type probe microscope of a third embodiment according to the invention will be explained in reference to a block diagram shown in FIG. 3. Further, an explanation of a point common to those of the first embodiment and the second embodiment will be omitted.

Figure 3:
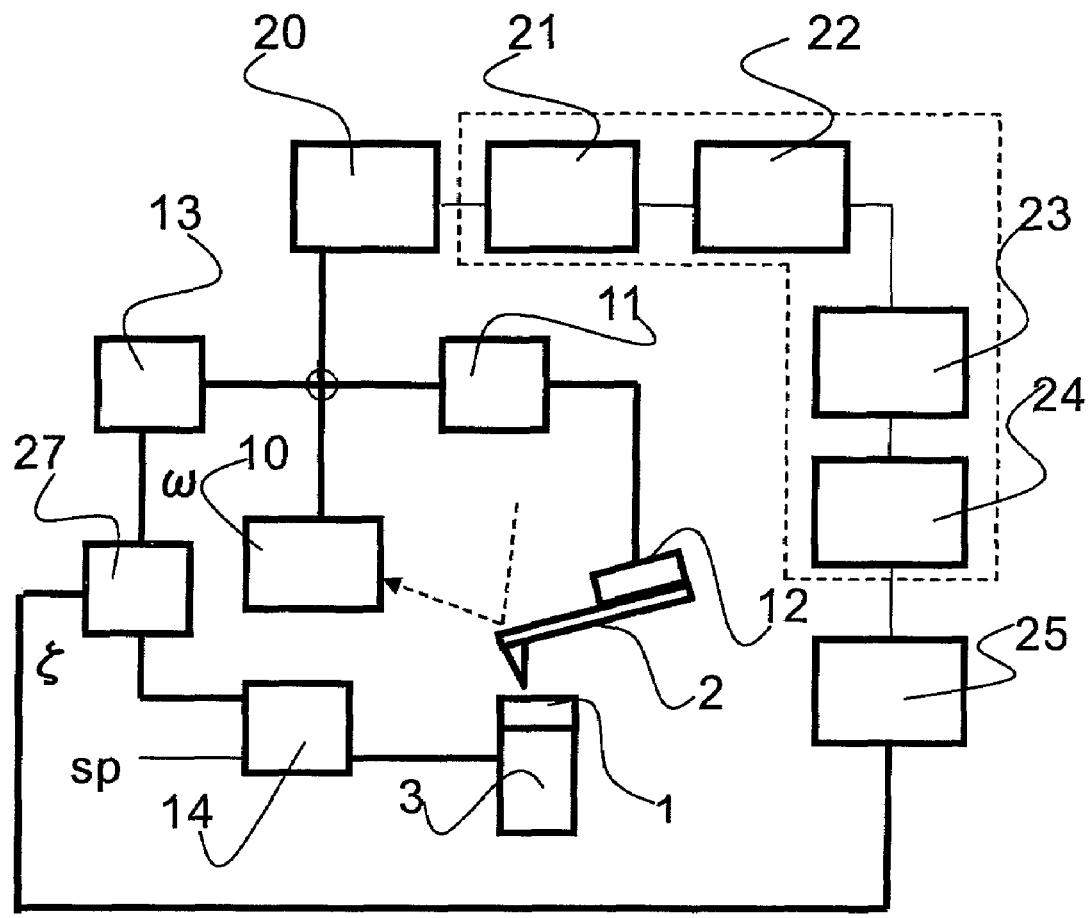
FIG. 3 is a block diagram showing a scanning type probe microscope according to a third embodiment of the invention.

In FIG. 3, there are provided a converter 26 for converting a calculated value of the value $\xi$ with regard to dissipation into an electric signal, and a third divider 27 for carrying out a division of $\xi/\omega$ by using a $\xi$ signal constituting an output thereof and a ω signal from the frequency detector 13, an error is amplified by comparing an output of the third divider 27 with set value sp, an output thereof is supplied to the piezoelectric element 3 to thereby control the distance between the stylus and the sample.

That is, the third embodiment may be regarded as a scanning type probe microscope of a dissipation control type for controlling the distance between the stylus and the sample to make a dissipation energy constant.

Naturally, digital values of the resonance frequency ω and the amount $\xi$ with regard to the dissipation may be inputted to a computer or DSP, the division of $\xi/\omega$, and comparison between the result and the set value sp and error detection may be carried out at inside of a computer or inside of DSP, a digital value of the result may be converted into an analog value by DAC, and supplied to the piezoelectric element 3 by way of the amplifier to thereby control the distance between the stylus and the sample.

Further, the amplitude detector 20 for successively measuring the amplitude of the resonating cantilever may include an analog circuit for detecting displacement signals over a plurality of periods of resonance to pass through the low pass filter. Further, a computer or DSP may carry out a series of processings of digitizing an output of the analog circuit, inputting the output to the computer or DSP, and calculating time difference values, quotients among time difference values, logarithms of quotients, ratios thereof with a difference time period and the like.

Further, although not illustrated in FIG. 3, as means for collecting, preserving and displaying a value in proportion to a feedback voltage to the piezoelectric element, the value $\xi$ with regard to the dissipation, the resonance frequency value $\omega$ and the like, it is preferable to provide ADC, DAC, or DSP, computer, a display and the like.

Fourth Embodiment

A fourth embodiment of the invention will be explained in reference to FIG. 4. Further, a point common to that of the third embodiment will be omitted.

Figure 4:
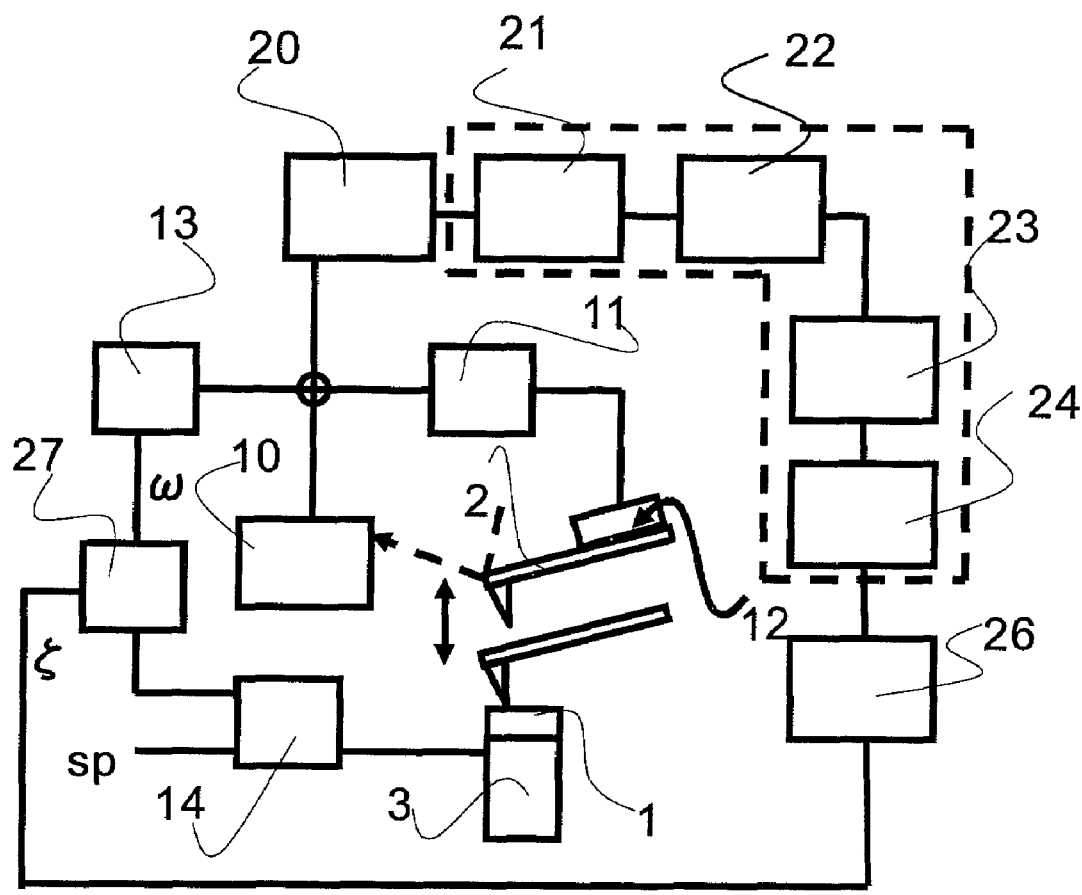
FIG. 4 is a block diagram showing a scanning type probe microscope according to a fourth embodiment of the invention.

In FIG. 4, the third embodiment is controlled to further carry out following scanning. That is, at the scanning point, the stylus is made to be proximate to the sample face, a position of the stylus (voltage applied to the piezoelectric element) is measured at the distance between the stylus and the sample at which $\xi/\omega$ becomes a value the same as that of sp, successively, the stylus is moved up to an upper side thereof. Further, the series of scanning is repeated while moving the scanning point. There is provided a scanning type probe microscope for imaging information of stylus positions at respective scanning points collected in this way.

Naturally, there is constructed a constitution in which even in the process of making the stylus proximate thereto or moving up the stylus, the frequency $\omega$ of resonance of the cantilever and the value $\xi$ with regard to the dissipation can be measured, and therefore, it is preferable to collect and display these.

Further, although the embodiment is constituted by combining the above-described scanning system to the third embodiment, the embodiment may be combined with the first embodiment or the second embodiment in place of the third embodiment.

For example, when combined with the second embodiment, there is constructed a constitution of measuring the position of the stylus (voltage applied to the piezoelectric element) at the distance between the stylus and the sample at which the value $\xi$ with regard to dissipation becomes the value the same as that of the set value sp to image.

According to the embodiment, by combining the above-described scanning systems, a physical factor of hampering the measurement of adsorption of the stylus to the sample, collision of the stylus and the sample or the like can be removed. Therefore, there is constructed a constitution of providing an effect of the invention more significant than those of the first through the third embodiments.

Although an explanation has been given of the embodiments in reference to the drawings as described above, the range of the invention is not limited to the embodiments but includes a design change or the like within the range not deviated from the gist of the invention.

What is claimed is:

1. A scanning type probe microscope characterized in a scanning type probe microscope comprising:

exciting means for carrying out a constant excitation by following a resonance frequency of a cantilever; and displacement detecting means for detecting a displacement of a stylus at a tip of the cantilever, the scanning type probe microscope further comprising:

means for successively providing an amplitude from a signal from the displacement detecting means;

means for providing an average amplitude by averaging the amplitudes at a plurality of periods;

means for providing a time difference value of the average amplitude;

means for providing a value of a quotient between the time difference values;

means for providing a logarithmic value of the value of the quotient; and second divider means for providing a value with regard to a dissipation by calculating a value constituted by dividing the logarithmic value by a difference time period.

2. The scanning type probe microscope according to claim 1, further comprising:

converter means for converting the value with regard to the dissipation calculated by the second divider means into an electric signal; and frequency detector means for detecting a resonance frequency of the cantilever from a displacement signal from the displacement detecting means, further comprising:

third divider means for calculating the dissipation value from a ratio of a signal in correspondence with the value with regard to the dissipation provided by the converter means to a value of the resonance frequency provided from the frequency detector means.

3. The scanning type probe microscope according to claim 1, further comprising:

scanning means for scanning the stylus relative to a surface of the sample in X, Y directions in parallel with the surface of the sample and a Z direction orthogonal to the surface of the sample;

measuring means for acquiring a measured data at a time point at which the stylus is made to be proximate to or brought into contact with the surface of the sample; and controlling means for controlling scanning in the X, Y directions and scanning in the Z direction;

wherein the controlling means stops scanning in the X, Y directions when the stylus reaches a measuring position by the scanning in the X, Y directions and scans the stylus in the Z direction of being proximate to the surface of the sample; and wherein the measuring means acquires the measured data at the time point at which the stylus is proximate to or brought into contact with the surface of the sample by scanning in the Z direction.

4. The scanning type probe microscope according to claim 1, further comprising means for controlling a distance between the stylus and the sample by using the value with regard to the dissipation.

5. The scanning type probe microscope according to claim 1, further comprising means for controlling a distance between the stylus and the sample by using the dissipation value.

6. The scanning type probe microscope according to claim 1, further comprising image apparatus for imaging the value with regard to the dissipation or the dissipation value.

* * * * *